United States Patent [19]

Dall'Olio et al.

[11] 3,988,543

[45] Oct. 26, 1976

[54] INTER-OFFICE SIGNALING SYSTEM FOR TELECOMMUNICATION NETWORK

[75] Inventors: Cristiano Dall'Olio; Enzo Garetti, both of Turin, Italy

[73] Assignee: CSELT - Centro Studi et Laboratori Telecomunicazione SpA, Turin, Italy

[22] Filed: Apr. 2, 1975

[21] Appl. No.: 564,549

[30] Foreign Application Priority Data

Apr. 2, 1974   Italy.................................. 68039/74

[52] U.S. Cl. ........................ 179/15 FD; 179/15 BY
[51] Int. Cl.² ........................................... H04J 1/14
[58] Field of Search....... 179/15 FD, 15 BY, 15 AT, 179/15 R, 16 A, 16 EC

[56] References Cited
UNITED STATES PATENTS

| | | | |
|---|---|---|---|
| 3,226,484 | 12/1965 | James............................ | 179/15 BY |
| 3,261,922 | 7/1966 | Edson........................... | 179/15 BY |
| 3,558,827 | 1/1971 | Lucas............................ | 179/15 BY |
| 3,701,851 | 10/1972 | Starrett.......................... | 179/15 FD |

Primary Examiner—William C. Cooper
Assistant Examiner—Joseph A. Popek
Attorney, Agent, or Firm—Karl F. Ross; Herbert Dubno

[57] ABSTRACT

Message transmission between subscriber stations served by different central offices takes place via frequency-division channels through the intermediary of couplers recognizing different line signals, specifically pulse sequences modulating the amplitude of a fixed-frequency oscillation on a test wire, to initiate certain switching operations. A processor, responding to these signals either upon initiation of a connection or in the course thereof, summons an available modem which is temporarily connected to the associated coupler and emits a characteristic a-c signal picked up by a remote coupler at another exchange which thereupon causes its processor to connect another modem to it, to the exclusion of any subscriber line to which that coupler may have been previously connected. The two modems then intercommunicate and work into respective logic networks which, under their control, carry out the requisite switching operations whereupon the modems are released upon establishment or re-establishment of the desired connection.

10 Claims, 7 Drawing Figures

| | | 6 | 2 | 1 | 8 |
|---|---|---|---|---|---|
| $\beta_{Ti}$ | $\gamma_{Ti}$ | GI | FD | CO | ST |
| 0 | 0 | A | D | B | D |
| 0 | 1 | D | A | D | D |
| 1 | 0 | A | D | A | (A) |
| 1 | 1 | A | D | D | A |

| 5 | 4 | 1 | 7 | | |
|---|---|---|---|---|---|
| CN | IN | FD | DE | $\beta_{Ri}$ | $\gamma_{Ri}$ |
| – | – | – | B | 0 | 0 |
| 3 | 0 | – | $\bar{B}$ | 0(T) | 0(T) |
| – | 1 | – | – | 0 | 0 |
| 1 | 0 | 0 | A | 0 | 1 |
| $\bar{3}$ | 0 | 0 | D | 1(T) | 0(T) |
| 2 | 0 | 0 | A | 1(T) | 0(T) |
| 0 | 0 | 0 | – | 1 | 1 |

INTER-OFFICE SIGNALING SYSTEM FOR TELECOMMUNICATION NETWORK

FIELD OF THE INVENTION

Our present invention relates to a telecommunication system for telephone communication for data transmission between subscriber stations served by respective central offices or exchanges.

BACKGROUND OF THE INVENTION

In such telecommunication systems it is known to use frequency-division multiplexing (FDM) for accommodating different channels, referred to hereinafter as trunk lines, on a common inter-office transmission link. The establishment of a connection is relatively time-consuming; generally, such systems do not permit the interruption of the ongoing conversation by either the calling or the called party for switching purposes, e.g. to set up a conference call, without the release of a previously engaged trunk line and the consequent loss of time in seizing another one.

OBJECT OF THE INVENTION

The object of our invention, therefore, is to provide an improved telecommunication system of the character referred to which obviates these disadvantages.

SUMMARY OF THE INVENTION

In accordance with the present invention, each central office is provided with a multiplicity of couplers connected to respective inter-office channels terminating thereat. A plurality of centralized modems at each central office can be temporarily connected to a seized channel through the coupler thereof, in response to incoming line signals and local selection signals, under the control of a processor which conventionally translates selection signals from a local subscriber into routing instructions and which in our present system also serves to control switching means at each central office for associating a coupler and a modem in the establishment or re-establishment of a connection over a trunk line. Outgoing and incoming line signals ancillary to the switching operation are recognized and repeated by circuitry in the coupler.

BRIEF DESCRIPTION OF THE DRAWING

The above and other features of our invention will now be described in detail with reference to the accompanying drawing in which.

SPECIFIC DESCRIPTION

Figure 1:
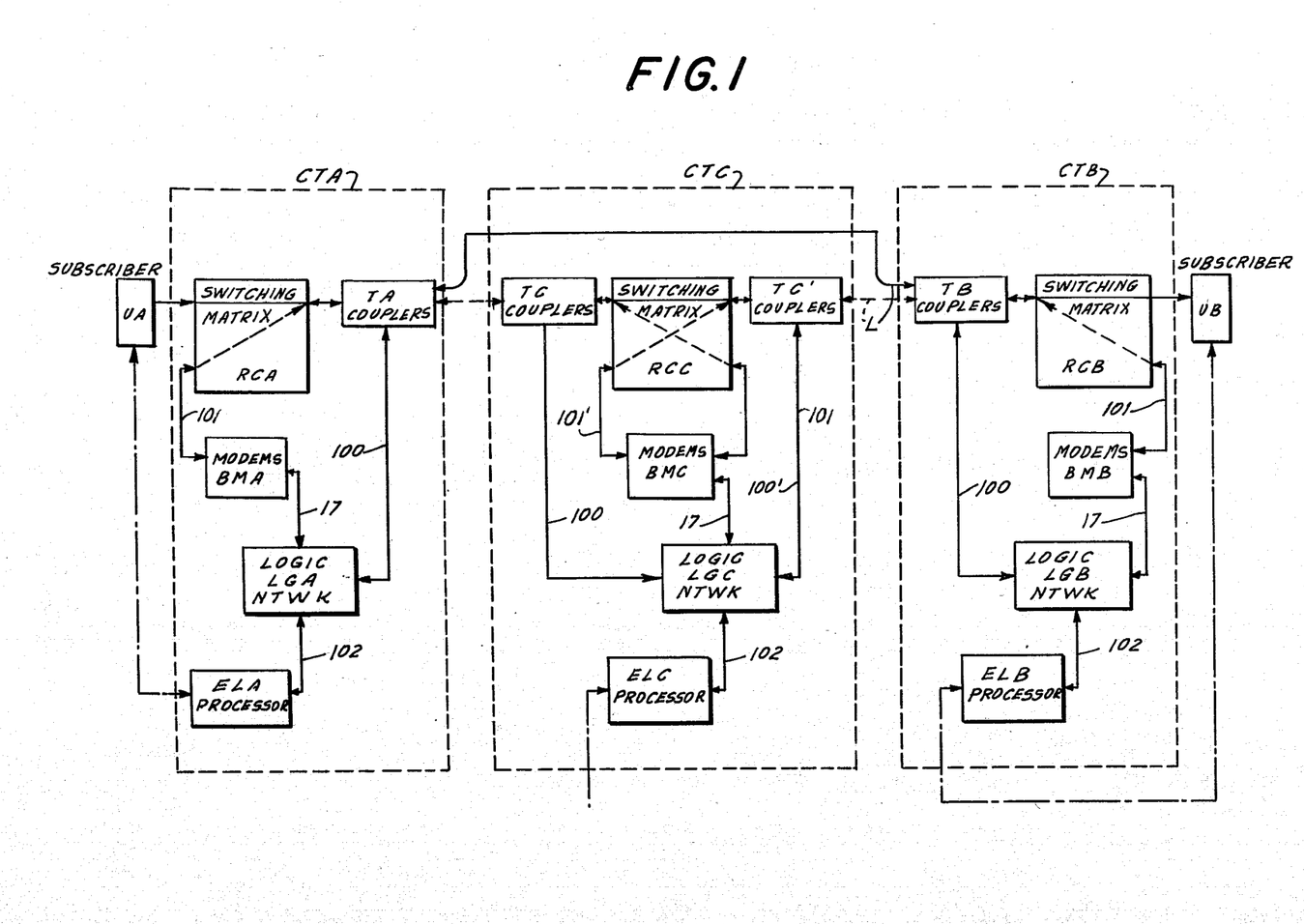
FIG. 1 is a block diagram of a telephone or other telecommunication system embodying our invention, comprising three central offices.

In FIG. 1 we have shown a telecommunication system with three central offices or exchanges CTA, CTB and CTC. Exchange CTA serves a multiplicity of local subscriber stations, one of which has been shown at UA; similarly, there has been shown at UB one of a multiplicity of subscriber stations served by exchange CTB. Exchange CTC, also associated with a network of subscribers, may be used as a transit station for communications between subscribers associated with terminal exchanges CTA and CTB; the latter exchanges are therefore interconnected by a multiplicity of trunk lines, generally designated L, some of which pass through the intermediate exchange CTC. Each line L may constitute a channel of a frequency-division-multiplex (FDM) group.

Exchanges CTA, CTB and CTC have substantially the same internal construction, comprising respective digital switching matrices RCA, RCB, RCC connectable via bidirectional conductor multiples 101 to groups of identical, centralized modems BMA, BMB, BMC; the switching matrices operate in the time-division-multiplex (TDM) mode and their connection to peripheral units workin with analog signals takes place through nonillustrated digital/analog converters of conventional type. Logic networks LGA, LGB, LGC communicate by way of similar multiples 17 and 102 with the associated modems BMA, BMB, BMC and respective processors ELA, ELB, ELC. Groups of peripheral couplers TA and TB are connected in exchanges CTA and CTB to networks LGA and LGA via multiples 100; in exchange CTC the corresponding couplers have been split into two subgroups TC and Tc' communicating with network LGC through respective multiples 100 and 100'.

The operating rates of the modems (e.g. 1200, 2400 or 4800 bit/sec.) lie within the same frequency band as the speech or data signals exchanged over the lines to which they are temporarily connected. These modems may be of any conventional design, preferably in conformity with CCITT recommendation V.24, each modem being equipped with a data terminal and an interface unit coacting with associated control circuits. Using conventional digital techniques, they may operate in a time-division mode so that the same structure can serve different channels.

The peripheral couplers TA, TB, TC, TC' can transmit over the associated lines, or receive therefrom, special pulse signals distinct from the modem signals by occupying a different frequency band. These pulse combinations can be produced, for example, by amplitude modulation of a oscillation of 3925Hz normally passing between central offices in each channel of an FDM group. Each coupler is capable of continuously transmitting and receiving its own characteristic signals over the associated line; in contrast, the modems BMA, BMB, BMC are normally disconnected from the lines and are called into service only when an exchange of information signals is necessary.

Let us assume that the subscriber at station UA wishes to communicate with subscriber station UB. By lifting the receiver of station UA, the subscriber signals to the processor ELA of the associated exchange CTA the identity of the calling station via the usual line finders and other conventional components not shown. Processor ELA establishes a connection between network LGA and station UA, which thereupon receives a dial tone in the known manner, and then stores the dial pulses identifying the called station. From the first digit, or pair of digits, the processor determines that the called station is not served by the exchange CTA but must be reached through another exchange, here specifically central office CTB. (If the called station were one of those associated with central office CTA, the connection would be established in the normal way without the intervention of a trunk and with no recourse to the system embodying our invention.)

Processor ELA now determines, from the contents of an internal memory, whether an idle trunk line leading to the desired exchange CTB is available. If no direct connection can be established, the call may be routed through exchange CTC.

Having found a free line to exchange CTB, processor ELA activates the associated logic network LGA to seize within group TA the particular coupler linked with that line. The processor then instructs the network LGA to search for an available modem within group BMA which thereupon emits an audio signal corresponding to its own carrier wave; this leads to the establishment, within matrix RCA, of a connection between the selected modem and coupler.

The carrier oscillation emitted by the selected modem now passes through the first coupler in group TA and the corresponding trunk line L to the second coupler in group TB of exchange CTB. The second coupler, interpreting the arriving carrier oscillation as a line-seizure signal, activates the associated logic network LGB which in turn informs the processor ELB of this seizure and searches for an available modem in group BMB. Upon locating such a modem, network LGB causes the establishment of a connection between that modem and the second coupler via switching matrix RCB.

With communication thus established between selected modems in groups BMA and BMB of central offices CTA and CTB, signals can now be exchanged to check whether the connection is correct. Thereafter, processor ELA forwards to processor ELB the first three call digits dialed by the calling subscriber, identifying the exchange CTB, via logic networks LGA, LGB, modems BMA, BMB, switching matrices RCA, RCB, couplers TA, TB and line L. Processor ELB, after storing these digits, orders the associated modem through logic network LGB to transmit to its counterpart in exchange CTA a "terminal ready" signal which recurs until processor ELA has transmitted to processor ELB the remaining digits and other relevant information in response to that signal.

Upon the completion of digit transmission, processor ELB sends to processor ELA an "end-of-selection" signal; in response thereto, networks LGA and LGB release the previously engaged modems whereupon the calling and called stations UA and UB are directly interconnected for voice or data communication by way of matrices RCA, RCB, couplers TA, TB and line L. At this point of station UB receives ringing current while the subscriber at station UA hears the corresponding audio signal.

As soon as the subscriber at station UB answers the call, processor ELB instructs the associated coupler in group TB via network LGB to send a response signal over the line L to the remote coupler in group TA. The latter coupler then signals the processor ELA, by way of network LGA, that the connection has been established and the computing of the charge for the call can commence. Units ELA, LGA, LGB and ELB remain connected to the participating couplers in groups TA and TB throughout the subsequent conversation.

If the call is terminated by the subscriber at station UA, processor ELA responds via conventional circuits not further illustrated and disconnects the subscriber station while ordering the associated first coupler via network LGA to send a disconnect signal over the line. The second coupler, upon detecting the signal, informs processor ELB by way of network LGB that the call has ended; this processor then disconnects the subscriber station UB and, again through network LGB, instructs the coupler in group TB to send over the line a confirmation signal whereupon the coupler and network LGB are released. In response to the confirmation signal, the coupler in group TA informs the processor ELA with consequent release of that coupler and network LGA. In an analogous manner, termination of the call at station UB results in the exchange of disconnect and confirmation signals followed by the release of the previously engaged components.

If a call intended for station UB is routed through exchange CTC, the processor ELC thereof responds in the aforedescribed manner during the initial phases up the reception of the exchange-identifying digits from processor ELA and the routing thereof through a coupler in group TC, switching matrix RCC and a selected modem in group BMC to processor ELC. This processor, on the basis of the received digits, determines that exchange CTC is to serve merely as a transit station inasmuch as the call is intended for a subscriber station served by another exchanger. Processor ELC, upon storing these digits, instructs the associated modem to transmit back to exchange CTA a "transit ready" signal and then proceeds to seize a further coupler in group TC', linked with an available trunk line leading to exchange CTB, in the manner described above with reference to processor ELA. This operation involves the selection of a second modem in group BMC, to be connected to the coupler of group TC' via a multiple 101' and switching matrix RCC.

When a "terminal ready" signal is received by processor ELC from exchange CTB, the two engaged modems in group BMC are released through network LGC and a direct connection between the couplers in groups TC and TC' is established through matrix RCC. In this condition, the interconnected couplers of exchange CTC are enabled to transmit all signals originating at the couplers of exchange CTA and CTB, with the exception of the disconnect signal which must be routed to processor ELC in order to cause the release of the engaged components of exchange CTC. The "terminal ready" signal, repeatedly emitted by the called coupler in group TB, is thus directly communicated to the engaged modem of group BMA and thence to processor ELA. The establishment and verification of a speech or data connection between the two subscriber stations can mnow proceed in the manner described above.

Let us now consider the case of one of the talking subscribers, say the one at station UA, sending out switching signals during the conversation. Processor ELA, upon detecting such a signal, instructs the associated coupler in group TA to send a modem-request signal over the line to the remote terminal, i.e. exchange CTB. The coupler in group TB, on detecting this signal, alerts processor ELB which instructs the network LGB to search for an available modem in group BMB. Upon location such a modem, network LGB connects same to the associated coupler in group TB while disconnecting the subscriber station UB therefrom. The coupler then sends back across the line a "modem ready" signal which is detected by the coupler in group TA and forwarded to processor ELA via network LGA; that processor, having disconnected the subscriber station UA from the associated coupler, now causes network LGA to search for an idle modem in group BMA to be connected to the coupler in group TA. At this point, the processor ELA can proceed to carry out the switching operations (e.g. establishment of a conference call) desired by the interrupting subscriber.

Figure 2:
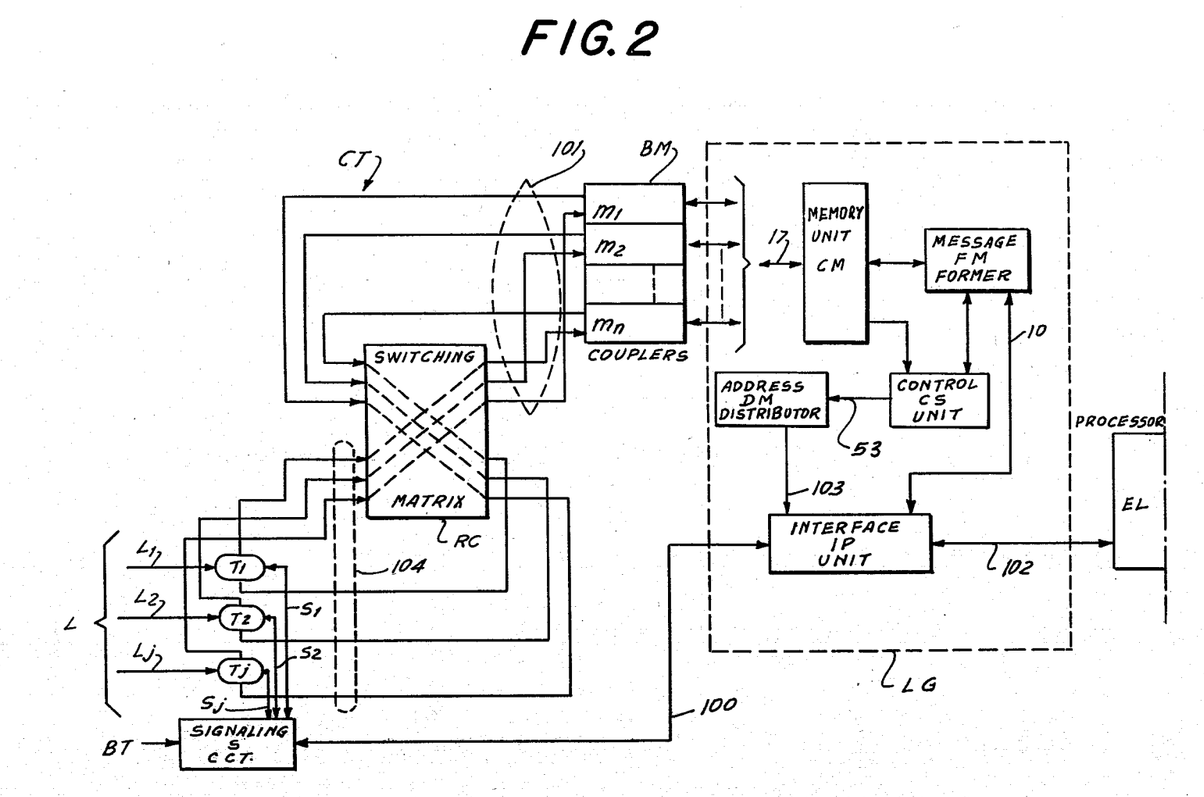
FIG. 2 is a more detailed block diagram of one of the central offices shown in FIG. 1.

In FIG. 2 we have shown details of a generic exchange CT representative of any of the three central offices shown in FIG. 1. This exchange, accordingly, comprises a switching matrix RC, a group BM of individual modems $m_1, m_2, \ldots m_n$, a logic network LG, a processor EL, and a set of peripheral couplers $T_1, T_2, \ldots T_j$ connected on the one hand to respective trunk lines $L_1, L_2, \ldots L_j$ and on the other hand via respective multiples $S_1, S_2, \ldots S_j$ to a signaling circuit S. Switching matrix RC is linked with the bank of modems BM via the set of leads 101 shown in FIG. 1, in series with a non-illustrated analog/digital converter, and with couplers $T_1, T_2, \ldots T_j$ by way of leads 104; the connections between that matrix and the local subscriber lines have been represented in this Figure.

Figure 3:
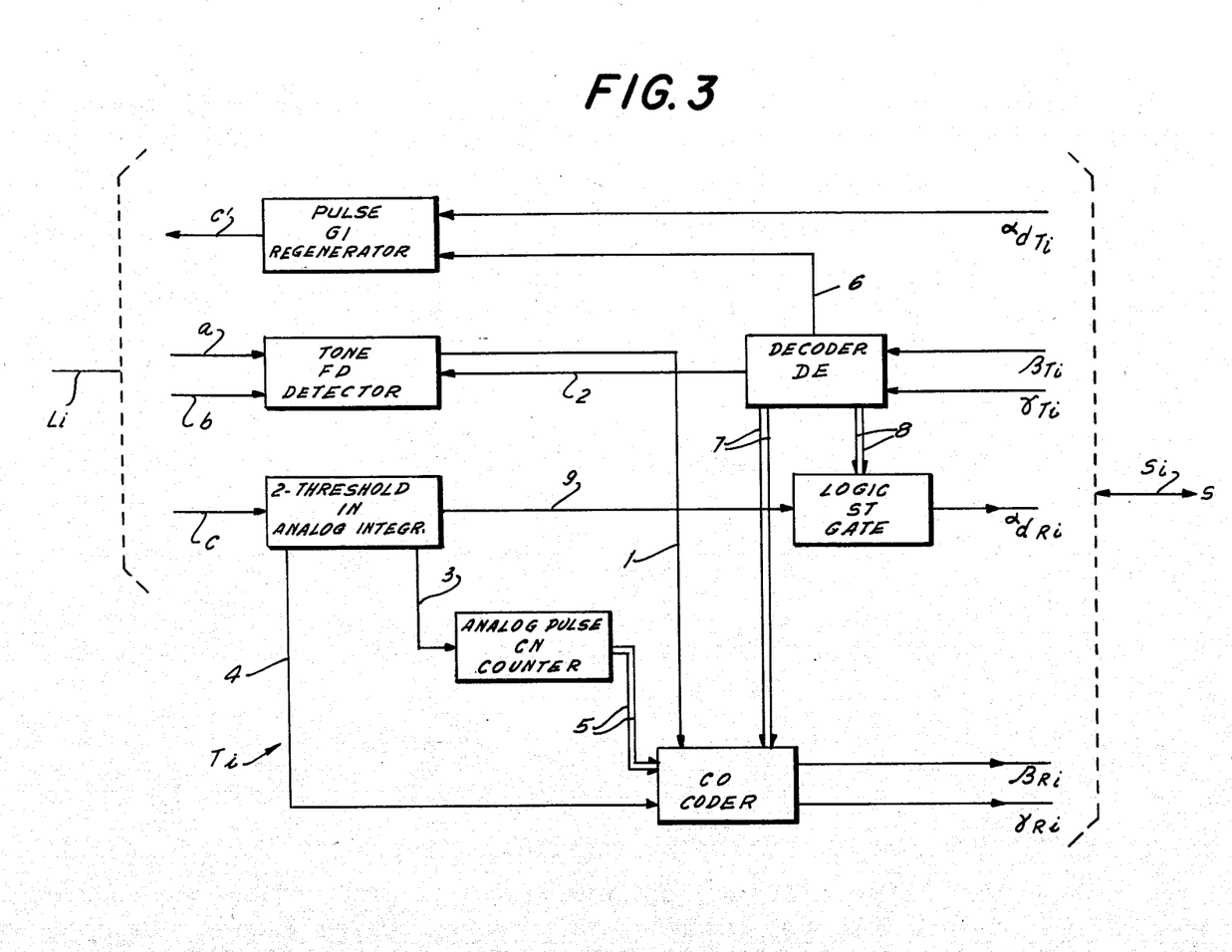
FIG. 3 shows further details of a coupling network forming part of the exchange shown in FIG. 2.
Figure 7:
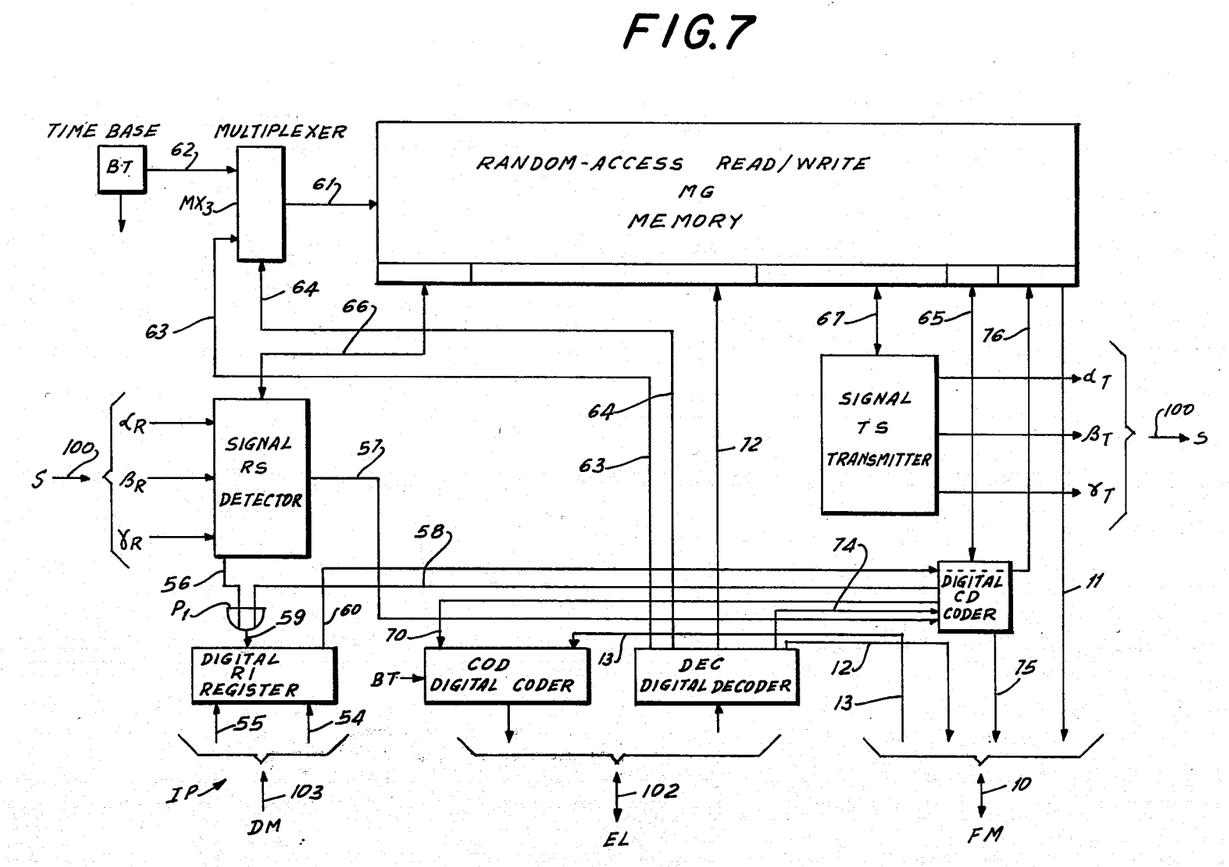
FIG. 7 is a detailed block diagram of an interface unit forming part of the same logic network.

Signaling circuit S, controlling by a time base BT shown in FIG. 7, scans signals on incoming branches of multiple $S_i - S_j$ (indicated at $\alpha_{Ri}, \beta_{Ri}, \gamma_{Ri}$ for a generic cable $S_i$ in FIG. 3) for retransmission to network LG in the TDM mode, by way of receiving branch leads $\alpha_R, \beta_R, \gamma_R$ (FIG. 7), and conversely distributes pulse samples from respective time slots, arriving over transmitting branch leads $\alpha_T, \beta_T, \gamma_T$ (FIG. 7), in integrated form onto outgoing branches of multiple $S_i - S_j$ designated $\alpha_{Ti}, \beta_{Ti}, \gamma_{Ti}$ for generic lead $S_i$ in FIG. 3.

It may be noted at this point that the demarcation line drawn between logic network LG and processor EL is somewhat arbitrary and that units included in network LG could also form part of the processor instead, or vice versa.

The components of logic network LG, more fully described hereinafter with reference to FIGS. 6 and 7, include a memory unit CM connected with the modems of unit BM via multiple 17 and serving to store message signals received from or intended for the associated modems; a message-forming unit FM for the interim storage of ancillary instructions passing between processor EL and the several modems; a control unit CS linked bidirectionally with message former FM and unidirectionally with memory unit CM; an address distributor DM connected with control unit CS by a lead 53; and an interface unit IP linked with units FM and DM via respective multiples 10 and 103, this interface unit being connected with processor EL through multiple 102 and with signaling circuit S through multiple 100.

Memory unit CM includes circuitry for establishing formats with synchronization and redundancy bits for outgoing messages and evaluating these bits for timing and checking purposes in the formats of incoming messages. Distributor DM continuously supplies the interface unit IP with the addresses of idle modems and insures the release of engaged modems after a predetermined period. Control unit CS coordinates the operations of components CM, FM and DM, determining whether an arriving message is proper for further processing and forwarding or whether a repetition of that message should be requested. Interface unit IP detects changes in signals arriving over multiple 100 and facilitates communication between processor EL and the other components of network LG; in particular, it transmits to the processor a trunk-identifying code together with signals received from a modem $m_i - m_n$ via message former FM and, conversely, insures the proper routing of signals from the processor designed for a modem temporarily connected to a particular trunk and coupler.

If the modems of bank BM are not adapted for TDM operation, they should be connected to memory CM through a conventional multiplexer/demultiplexer controlled by time base BT and provided with a multiplicity of registers bi-univocally associated with respective modems.

In FIG. 3 we have shown the layout of a generic coupler $T_i$ connected between a line $L_i$ and a cable $S_i$; the line includes the usual loop conductors $a, b$ and test wires $c, c'$ for communication in both directions. It will be understood that these wires are connected through FDM multiplexers/demultiplexers, not shown, to an inter-office link over which their messages are transmitted or received in a band of elevated frequencies allocated to the channel in question.

The internal switches designed to establish a two-way connection between line $L_i$ and matrix RC, via leads 104 of FIG. 2, have not been illustrated.

Coupler $T_i$ comprises a signal-pulse regenerator GI connected between transmitting branch lead $\alpha_{Ti}$ and outgoing line conductor $c'$; a tone detector FD connected across incoming line conductors $a, b$ and working by way of a lead 1 into a coder CO; a two-threshold analog integrator IN receiving signals over incoming line conductor $c$ and working through a lead 3 into an analog pulse counter CN, through a lead 4 into coder CO and through a lead 9 by way of a logic gate ST into receiving branch lead $\alpha_{Ri}$; and a decoder DE connected to transmitting branch leads $\beta_{Ti}, \gamma_{Ti}$, this decoder having an output lead 2 for enabling the tone detector FD, another output lead 6 for enabling the pulse regenerator GI, a pair of output leads 7 for enabling or blocking the coder CO, and a further pair of leads 8 controlling the gate ST. Coder CO selectively energizes the receiving branch leads $\beta_{Ri}$ and $\gamma_{Ri}$.

Signal regenerator GI, when enabled by lead 6, converts incoming pulses on lead $\alpha_{Ti}$ into outgoing pulses of predetermined duration on lead $c'$; when not so enabled, it simply retransmits the incoming pulses with their original length. Tone detector FD in its enabled state responds to a carrier oscillation arriving over line $L_i$ from a remote modem to trigger the coder CO, via lead 1, into emission of a line-seizure signal. Integrator IN energizes its output leads 3 in response to the arrival, over lead $c$, of a pulse whose duration exceeds a lower time limit representing a first threshold; if that pulse outlasts an upper time limit, or second threshold, output lead 4 is energized. Counter CN registers the number of such pulses, in a sequence followed by a pause, on a plurality of output leads 5 (two such leads being sufficient if a binary code is used) and delivers that count to the coder CO; a count of 3, representing the maximum envisaged in this embodiment, constitutes a disconnect signal whereas a pulse exceeding the upper time limit — thus causing energization of lead 4 — represents a blocking signal.

The pulses arriving on test wire $c$, regardless of their duration, are reproduced in regenerated form on the output lead 9 of integrator CN.

Figure 4:
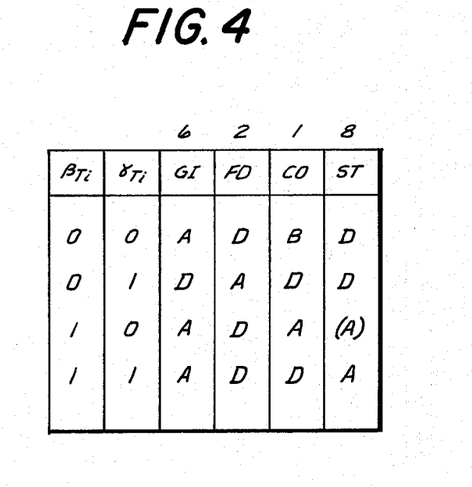
FIGS. 4 and 5 are truth tables relating to the operation of two components of the network of FIG. 3.

Decoder DE, responding to the signals on leads $\beta_{Ti}$ and $\gamma_{Ti}$, operates in conformity with the truth table of FIG. 4. In that table, letter A indicates an enabling signal on a corresponding lead whereas letter D indicates the absence thereof. Letter B, in the case of lead 1, signifies the blocking of coder CO which means a zero output on both leads $\beta_{Ri}$ and $\gamma_{Ri}$ regardless of the number of input pulses, if any; in contrast, disablement of the coder (letter D) means only that the same will be insensitive to a count of 1 or 2 but will generate the disconnect signal in the presence of a count of 3 on leads 5.

In the blocking condition (top row), characterized by the concurrent de-energization of the two leads $\beta_{Ti}$ and $\gamma_{Ti}$, pulse regenerator GI is enabled and coder CO is blocked; this occurs when the line is engaged in a call. In standby condition (second row) the enablement of detector FD permits the recognition of line seizure. In the "terminal" state (third row), i.e. with coupler $T_i$ located at the end of a trunk line interconnecting the calling and called stations, pulse regenerator GI and coder CO are both enabled; the symbol (A) in the column of gate ST indicates that this gate is opened only long enough to pass the first pulse arriving over lead 9 as a response signal and to stop all subsequent pulses. In the "transit" state (bottom row), characterized by the energization of both input leads $\beta_{Ti}$ and $\gamma_{Ti}$, pulse regenerator GI is again enabled while gate ST is open for the passage of all pulses on lead 9.

Figure 5:
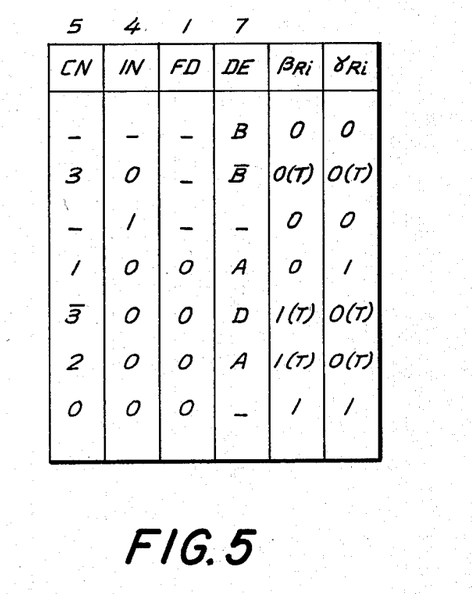

The operation of coder CO is reflected by the truth table of FIG. 5 as it affects the energizaton of output leads $\beta_{Ri}$ and $\gamma_{Ri}$ in response to different signals on leads 1, 4, 5 and 7. A dash (—) indicates that the state of the corresponding lead or leads is immaterial. In column CN, the numbers indicate the pulse count received over leads 5 (with $\overline{3}$ denoting a count other than 3). In columns IN and FD the numbers 0 and 1 represent the binary states of leads 4 and 1. In column DE the letters A, B and D have the same meaning as in FIG. 4, with $\overline{B}$ signifying the absence of a blocking signal B. In column $\beta_{Ri}$ and $\gamma_{Ri}$ the binary states of the output leads of the coder are indicated by numbers 0 and 1, with the postscript (T) signifying that the indicated state is only of limited duration and is thereafter replaced by the previous condition of the respective lead.

Thus, the blocking condition 0/0 is invariably established in response to either a signal B from decoder DE or energization of output lead 4 of integrator IN. Simultaneous de-energization of leads 2, 4 and 5 (bottom row) overrides a possible blocking signal B from decoder DE to establish the condition 1/1 enabling subsequent recognition of the disconnect signal 0/(T)/0/(T), in response to a pulse count of 3 (second row), by the processor.

From the foregoing description it will be apparent that the several components of coupler $T_i$ perform the following functions:

a. identification by the detector FD of an incoming carrier wave as a line-seizure signal translated into the binary code 1(T)/0(T), according to the 5the row of the table in FIG. 5;

b. transmission of incoming line signals from conductor $c$ via integrator IN and gate ST toward the pocessor, these line signals being in the form of short pulse sequences (with up to three pulses) amplitude-modulated upon a fixed-frequency wave such as the aforementioned oscillation of 3925 Hz (transposed, of course, during inter-office transmission into the frequency bands of the various channels);

c. translation of these line signals through coder CO into data recognizable by the associated processor and conversion of instructions from the processor under the control of detector DE into outgoing line signals by pulse regenerator GI;

d. discrimination among signal pulses of different duration by integrator IN; and e. selective reduction of data, with the aid of gate ST, transmitted to the further stages.

We shall now refer to FIG. 6 for a detailed description of the components of logic network LG, except for interface unit IP which will be described in conjunction with FIG. 7.

Logic network LG comprises a number of random-access memories which will be referred to as a first and a second register $M_1$, $M_2$ in unit CM, a third and a fourth register $M_3$, $M_4$ in unit FM, a counting register MC in unit CS and an updating register MS in the same unit, the latter register controlling the address distributor DM. All these registers must have a sufficiently high operating speed and a storage capacity for a number of words at least equal to the number $n$ of modems in bank BM (FIG. 2). Unit CM further contains a sync-signal extractor SN and a redundancy generator LR. Unit CS additionally includes a read-only memory RM co-operating with register MS, a pair of logical decision networks LD and LA, an adder $\Sigma$, two binary decoders $D_1$ and $D_2$, and a conventional priority encoder $PE_1$ giving preference in its binary output to certain input signals over others. Two further priority encoders $PE_2$ and $PE_3$ are included in unit FM together with a pair of multiplexers $MX_1$ and $MX_2$. The functions of decoders $D_1$ and $D_2$ are complementary to those of encoders $PE_1$ - $PE_3$.

The multiple 10 interconnecting units FM and IP, as shown in FIG. 2, includes cables 11, 12, 13 and 75. Cable 11 carries to registers $M_3$ and $M_4$, in a TDM sequence, the addresses (originating at interface unit IP) of modems engaged for signal transmission or reception over seized trunk lines. Cable 12 delivers to register $M_4$, in parallel, the bits of any message from the processor (e.g. dial pulses) to be transmitted to the line through an engaged modem. Cable 75 carries information concerning the type of operation (e.g. "message transmission in progress", "request for response", "seizure") to be performed by the logic network LG, in any phase of a cycle, with respect to the modem concurrently identified by the address arriving over cable 11. Cable 13 transmits to unit IP, again in parallel, the bits of any message stored in register $M_3$ with reference to the currently addressed modem. Buffer registers $M_3$ and $M_4$ must be capable of storing an entire message coming from or destined for any modem whose address periodically appears on cable 11.

Outgoing data are read out from register $M_4$ via a cable 14 to multiplexer $MX_1$ and in parallel therewith, via a cable 15, to decoder $D_1$. In response to certain characteristic bits of a word received over cable 15, decoder $D_1$ generates instructions for encoder $PE_1$ on a cable 16.

Multiple 17, extending between modem bank BM and memory unit CM, encompasses cables 18 – 23. Cable 18, some of whose wires pass through sync-signal extractor SN while others bypass same, terminates at register $M_1$ and also has a branch 25 extending to redundancy generator LR. The addresses of the modems being scanned, whose messages arrive over cable 18, appear periodically on calbe 19 also entering the register $M_1$. The wires of cable 18 bypassing the extractor SN may carry information such as "presence of carrier", "ready to transmit" or "time distribution of bits in transmission".

Cable 20 conveys the parallel bits of data to be read out from register $M_2$ to a modem whose address is periodically delivered to that register via cable 21. The latter cable is also connected to register MS and, via an extension 47, to register MC. Some of the wires of cable 20 carry ancillary bits representing operating instructions (e.g. "enabling", "request for data transmission") for the respective modem. The words appearing on cable 20 are also transmitted through a branch 24 thereof to redundancy generator LR which delivers verification bits to the modem bank BM by way of cable 23. Arriving verification bits are fed to redundancy generator LR via cable 22.

On the basis of the information received, circuit LR is able to detect possible errors in signal reception over the line; is such an error is found, encoder $PE_1$ is alerted via a lead 26.

The data stored in register $M_1$ are fed via a cable 27 to multiplexer $MX_2$ and via a branch 28 of that cable to decoder $D_2$, the latter controlling the encoder $PE_1$ through a cable 29 in a manner similar to that of decoder $D_1$.

An output lead 30 of decision network LD, if energized, enables the multiplexer $MX_1$ to transfer the data of register $M_4$ via cable 14 and another cable 31 to register $M_2$; if lead 30 is de-energized, the contents of encoder $PE_3$ are delivered to register $M_2$ via a cable 32 and multiple 31. In a similar manner, an output lead 33 of network LD authorizes, when energized, the transfer of data from register $M_1$ via cable 27 and multiplexer $MX_2$ by way of a cable 34 to register $M_3$; if lead 33 is de-energized, the contents of encoder $PE_2$ are so transferred via a cable 35 extending to multiplexer $MX_2$. The two priority encoders $PE_2$ and $PE_3$ are loaded from decision network LD by way of respective connections 42 and 43.

Encoder $PE_1$ has a further input connection 36, originating at decision network LA, and generates on an output 37 a binary information for memory MR identifying an energized input lead which has preference in the order of assigned priority.

Figure 6:
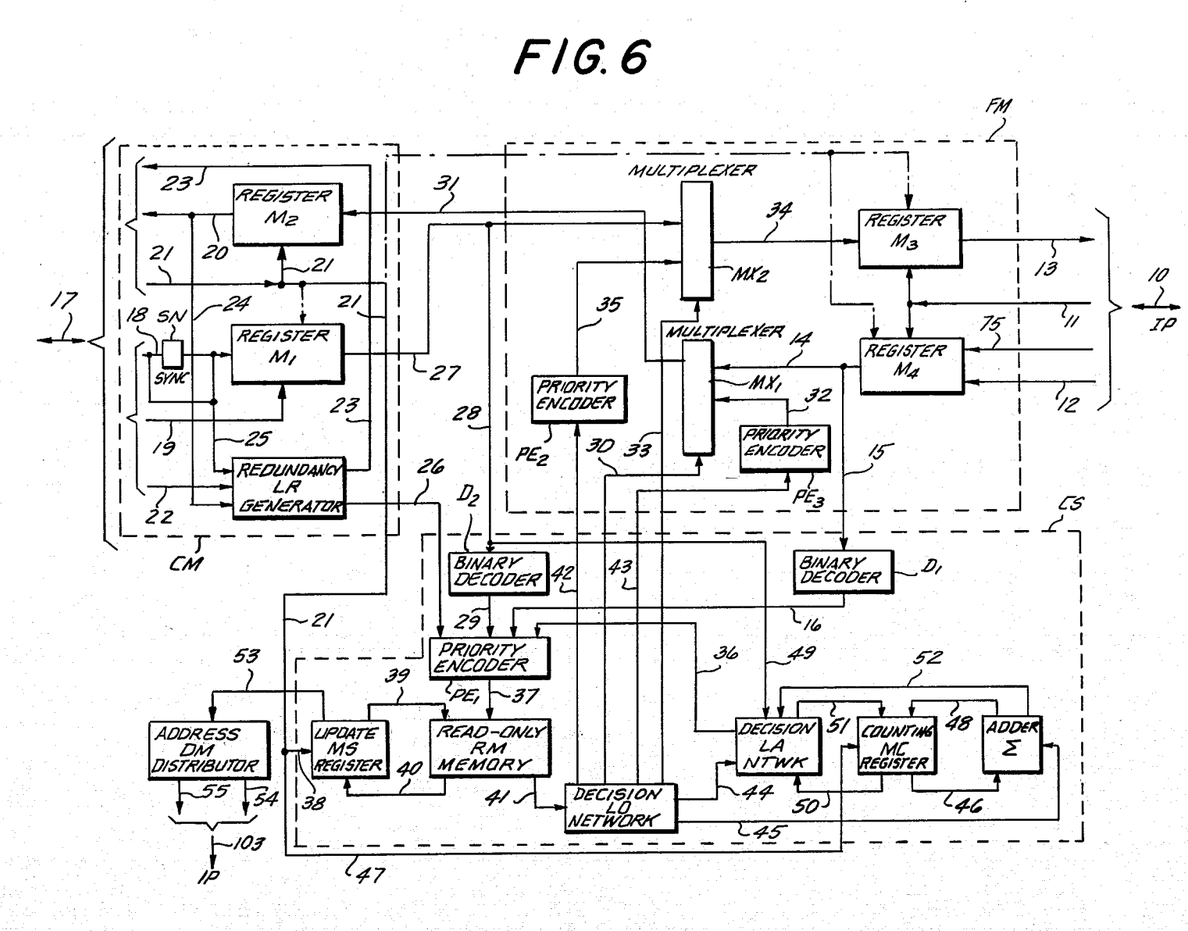
FIG. 6 is a detailed block diagram of part of a logic network included in the central office of FIG. 2.

The time allotted to a particular modem is transmission or reception is subdivided into two intervals, the first interval serving to update the information stored in registers $M_1$, $M_3$ and $M_4$ via branch leads from cable 21 as indicated diagrammatically by phantom lines in FIG. 6. In the second interval the connections indicated in full lines are ineffective to operate these registers in the manner described above. This subdivision of a time slot may be realized, in a way readily apparent to persons skilled in the art and not further illustrated, with the aid of multiplexers similar to those shown at $MX_1$ and $MX_2$.

Registers MS stores coded information concerning the current state of control unit CS with reference to any modem. This coded information is sequentially transmitted to read-only memory RM via a connection 39 to identify, together with the data in the output 37 of encoder $PE_1$, the address of the modem whose current status is to be ascertained, according to signals arriving over cable 21. These data define the operation to be carried out and result in the generation, on a connection 41 between memory RM and network LD, of information causing the emission of corresponding switching instructions by this network through selective energization of its aforementioned outputs 30, 33, 42, 43 and further outputs 44 and 45 connected to network LA and adder $\Sigma$.

The output 46 of register MC delivers to adder $\Sigma$ a count measuring the length of engagement of a given modem, identified by the address on cable 47, as of the immediately preceding cycle. In response to a signal on lead 45, the adder increases that count by 1 and feeds the new total back over a connection 48 to register MC. The state of operation of the modem in question is communicated to network LA by an extension 49 of cable branch 28, this network receiving simultaneously the updated count from register MC. In response to an enabling signal on lead 44, network LA instructs the encoder $PE_1$ via cable 36 as well as the register MC by way of a connection 51 as to whether or not that particular modem has come to the end of its permissible engagement period.

Address distributor DM receives information from register MS via a connection 53, that information including bits partly identifying a specific modem and partly indicating its current engaged or released state. Distributor DM is essentially a register with parallel input and parallel output. If a modem is found to be idle, its address is stored in the distributor; otherwise, the contents of the distributor are not modified.

Multiple 103, extending from address distributor DM to interface unit IP as also shown in FIG. 2, includes a cable 54 carrying the address of an idle modem; if unit IP engages that modem, a busy signal appears on lead 55 of multiple 103 but disappears as soon as the address of another idle modem is generated on cable 54.

Interface unit IP, as shown in FIG. 7, includes a random-access read/write memory MG having a capacity equal to the number $j$ of associated couplers. A signal detector RS is connected to incoming branch leads $\alpha_R$, $\beta_R$, $\gamma_R$ of multiple 100 coming from signaling circuit S (FIG. 2). A digital register RI, with an enabling input 59 energizable via an OR gate $P_1$, receives the address of an available modem from distributor DM (FIG. 6) on cable 54 as well as a busy signal on lead 55 as described above. A signal transmitter TS works into outgoing branch leads $\alpha_T$, $\beta_T$, $\gamma_T$ of multiple 100. There is also provided a multiplexer $MX_3$ receiving timing pulses via a lead 62 from time base BT, a digital coder COD also controlled by that time base, another such coder CD, and a digital decoder DEC.

Signal detector RS has outputs 56 and 57, the former feeding the OR gate $P_1$ whereas the latter extends to coder CD. Lead 56 is energized if, and only if, the binary signals on leads $\beta_R$ and $\gamma_R$ are respectively 1 and 0 as they are under the conditions represented by the 5th and 6th rows of the truth table of FIG. 5. Coder CD is linked with coder COD via an output connection 70. An output lead 58 of coder CD extends to the second input of OR gate $P_1$.

Cables 11 and 12 of multiple 10 originate at memory MG and decoder DEC, respectively. Cable 13 feeds the coder COD whereas cable 75 originates at coder CD. Multiple 102, leading to the processor EL (FIG. 2), has respective branches in the output of coder COD and in the input of decoder DEC. The decoder works via a multiple 72 into memory MG and via a connection 63 into multiplexer $MX_3$ which it controls by way of a lead 64. Two-way connections between memory MG and coder CD, signal detector RS and digit generators TS have been indicated at 65, 66 amd 67, respectively. A connection 60 leads from register RI to coder CD and is thence continued by an extension 76 to memory MG. Multiplexer $MX_3$ has an output 61 also terminating at that memory.

The address appearing on cable 54 is transmitted to memory MG, in the absence of a busy signal on lead 55, via link 60, CD, 76, provided an enabling signal exists on the output 59 of OR gate $P_1$.

On instruction from processor EL, decoder DEC switches the multiplexer $MX_3$ from its normal state of timing-signal transmission to its alternate condition in which data on output connection 63 are fed to memory MG.

Memory MG, via two-way connection 66, controls the timing of the integrating of incoming signals from engaged trunk lines in signal detector RS, it also controls via connection 67 the transmission of signals from circuit TS to these lines. Information concerning the status of any modem is communicated to coder CD by the connection 65 and the address of a modem assigned to a line is conveyed via cable 11 to unit FM. The several time slots of a scanning cycle, giving access to respective stages of memory MG under the control of time base BT, are again subdivided into two intervals each, the first interval serving for the updating of the information stored in that memory; the second interval is reserved for the exchange of information between memory MG and processor EL as well as message former FM, in response to an instruction from the processor causing the energization of output lead 64 of decoder DEC; in the absence of such an instruction, the contents of the memory regarding the address last scanned by timer BT are not modified.

Signals appearing in the output 57 of decoder RS (e.g. "request for a modem", "answer", "release"), relating to a coupler addressed by signaling circuit S (FIG. 2), are transmitted by way of coder CD and connection 70 to coder COD which, upon receiving the address of the corresponding coupler from timer BT, transmits a message to processor EL during the aforementioned second time interval of a scanning slot. Coder CD controls the loading of coder COD via connection 70 in such a way as to avoid overlapping with signals arriving from unit FM via cable 13.

Decoder DEC translates the instructions from processor EL into information suitable for handling in unit IP. On receiving the address of the coupler for which a particular message is intended, it energizes its lead 64 and transmits the instruction through multiplexer $MX_3$ to memory MG. If the message is to be transmitted as a line signal over the outgoing branch leads in multiple 100, decoder COD feeds it directly via input 72 to memory MG. If, on the other hand, that message contains an information to be transmitted by one of the modems, that information is delivered unchanged to unit FM by way of cable 12; simultaneously cable 11 carries the address of the engaged modem to unit FM while decoder CED delivers to coder CD, over connection 74, a "data present" signal which is converted into binary form and retransmitted by that coder on cable 75.

If the measage is limited to operating instructions for the selected modem (e.g. enablement or release), conductors 74 and 75 are utilized together with cable 11; in that case the cable 12 is not used.

In addition to the aforedescribed operation, coder CD also has the following functions: From detector RS it receives via connection 57 the information that a line signal from the currently scanned coupler has been identified, especially a signal requesting the assignment of a modem; if register RI thereupon emits an address via conductors 60 and 76 to memory MG as an indication that a modem has been engaged, coder CD enters a busy indication in the correspondng stage of memory MG in lieu of the availability signal normally present there. During the next scan of that modem by timer BT, if the busy indication has not been entered, coder CD energizes the OR gate P, via lead 58, in order to repeat the request for a modem sent to register RI; this operation recurs until a modem has been assigned.

If a modem is requested in a message coming from the processor, coder CD responds to that request by energizing its lead 58, this being followed by the sequence of operations just described.

Upon engagement of a given modem, and for as long as there is no signal on connection 57 which would interfere with signals on cable 13 destined for coder COD, provided that no operational commands are present on leads 60 and 74, coder CD sends out to unit FM by way of cable 75 a coded binary signal of "request for a message"; the address of the engaged modem is simultaneously transmitted to unit FM via cable 11.

If a message is waiting in unit FM, the same is transmitted to coder COD via cable 13. If, on the other hand, coder CD detects the presence of signals in its input connection 57, it waits for the next cycle in order to send the message request to unit FM via cable 75.

Signal transmitter TS is adapted to receive from memory MG, via connection 67, instructions for sending out certain signals stored in the previous cycle in that memory upon delivery thereto from decoder DEC by way of connection 72. Transmitter TS converts these code signals into a ternary bit combination on leads $\alpha_T, \beta_T, \gamma_T$ and may also start a timing operation to establish a minimum interval during which the same data from memory MG must be received in successive scanning cycles to produce a change in a pre-existing output signal of the transmitter. During each scanning cycle of timer BT, the data supplied to transmitter TS via connection 67 are updated with restarting of the time count in the event of a change.

Signal detector RS, in response to incoming bit combinations, updates the contents of memory MG via connection 66. If in regard to a particular coupler a difference is detected between the information read out from memory MG and the data arriving over multiple 100, a count is started which measures a time during which such a change must be observed in order to give rise to a new output on leads 56 and 57.

From the foregoing description it wll be apparent that the following operations are performed by the components of the centralized logic network LG:

A. Engagement of a coupler $T_i$ (FIG. 2) by means of signal transmitter TS (FIG. 7) in response to an engagement instruction from processor EL, communicated to it by way of decoder DEC and memory MG.

B. Search for an idle modem, promptly upon engagement of a coupler. This search is initiated by coder CD upon reception of an engagement instruction from processor EL by way of decoder DEC; an acquisition command is then delivered via lead 58 and OR gate $P_1$ to register RI with reference to the sequence of idle addresses read out from unit DM via cable 54. This acquisition is registered in memory MG by way of the aforedescribed connection 60, CD, 76.

C. Generation of an instruction enabling an engaged modem to emit an audio signal in the form of a channel carrier. This is accomplished by coder CD learning via connection 65 from memory MG that a modem has been engaged; the coder then instructs unit FM via cable 75 to initiate carrier transmission from the modem whose address appears on cable 11. The information concerning this enablement is stored in memory MG via connection 65. In unit FM (FIG. 6), register $M_4$ receives this instruction and address and, via decoder $D_1$, transmits the corresponding information by way of encoder $PE_1$ to memory RM which in turn inscribes the new state in register MS. Memory RM, through network LD and connection 30, switches multiplexer $MX_1$ to let register $M_4$ communicate with register $M_2$ via multiple 31, the instruction for the generation of the audio signal thus reaching the modem in question via multiple 17.

D. Communication of line seizure to the processor. The corresponding signal arrives from coupler $T_i$ via circuit S and wires $\beta_R$, $\gamma_R$ at signal detector RS which so informs the coder CD by way of connection 57. Coder CD thereupon updates the corresponding stage of memory MG through connection 65 and also transmits this information to processor EL by way of connection 70 and coder COD.

E. Search for an idle modem to receive incoming signals. Detector RS, on recognizing the line seizure, signals the register RI by way of gate $P_1$ to engage an idle modem. The address of that modem, again, is stored in memory MG via the aforedescribed route. The procedure of instructing that modem to generate its characteristic carrier wave is analogous to that described above under (C).

F. Detection of a channel carrier from the modem of the remote exchange. The local modem already connected to the line, responding to the incoming carrier, sends a signal to network LA via leads 18, 27, 28 and 49 (FIG. 6). Network LA, noting the switchover from nonreception to reception of a carrier, informs encoder $PE_1$ of this situation. The encoder transmits this information to memory RM which, via network LD, causes encoder $PE_2$ to switch the multiplexer $MX_2$ for delivery of the same message via leads 27, 34 and 13 by way of register $M_3$ to the processor. Memory RM, via network LD, has meanwhile instructed the adder $\Sigma$ to increase its count by successive increments to measure a predetermined time limit. If the capacity of the adder is exceeded thereby, that condition is reported to network LA via lead 52 whereupon encoder $PE_1$ is commanded to emit a trouble signal. If, on the other hand, the carrier arrives in due time, an OK signal is delivered by network LA to encoder $PE_1$ and is registered in memory RM as well as transmitted to the processor while network LD resets the adder $\Sigma$ to a count of 0.

G. Message transmission and reception through the engaged modems. This includes dial pulses, supervisory signals such as "terminal ready" and "transit ready" as well as line signals passing through the engaged couplers such as response by the called party, release of the line and confirmation of disconnection.

H. Monitoring of the line during conversion. In this phase no modems are connected to the line and all units directly co-operating therewith (specifically components CM, FM and CS in FIG. 6) are in an idle condition. Unit DM, however, continues to present the addresses of available modems and signal detector RS is in a standby state while transmitter TS energizes the leads $\beta_T$ and $\gamma_T$ in dependence upon the transit or terminal condition which prevailed in the exchange when the connection was established.

Digital signals are received from the line through the modems without intervention of any of the coupler elements shown in FIG. 3. The pulse-modulated signal passes through switching matrix RC to the assigned modem in unit BM (FIG. 2) for demodulation the resulting bit sequence being delivered in parallel to circuits SN and LR via leads 18 and 22 of FIGS. 6. After synchronization has been established, the message is fed on the one hand to register $M_1$ and on the other hand to redundancy generator LR, the latter determining whether an error is present and in such a case triggering decoder $PE_1$ into the emission of an instruction for register $M_2$, via units LD, $PE_3$ and $MI_1$, to request a repetition. If no error is found to exist, the incoming message is stored in register $M_1$ which transmits it to multiplexer $MX_2$ and informs encoder $PE_1$ via decoder $D_2$ of the type of message received. Memory RM obtains this information from encoder $PE_1$ and determines from the data available in register MS whether that message is consistent with the state of the incipient or existing connection. If the message is found to be consistent, memory RM causes network LD to switch the multiplexer $MX_2$ for the transfer of that message to register $M_3$. If consistency is lacking, memory RM emits an error signal whereupon network LD switches the multiplexer $MX_2$ so that an alarm message can be sent from encoder $PE_2$ to register $M_3$.

When memory MG, under the control of timer BT, sends to unit FM via cable 11 the address of an engaged modem, coder CD transmits to that unit via cable 75 a request for a message and register $M_3$ delivers to coder COD via cable 13 the stored message together with a "data ready" code, in parallel. Coder COD delivers this information to processor EL.

Outgoing digital messages, originating at processor EL, are sent in parallel to unit FM through decoder DEC, via cable 12, while a "data ready" code is delivered to coder CD via connection 74 and the address of the coupler connection to the desired trunk line is fed to memory MG by way of connection 63 and multiplexer $MX_3$. Memory MG, having received that address, sends to unit FM on cable 11 the address of the assigned modem and coder CD delivers to unit FM via cable 75 a message-transmit command. In unit FM (FIG. 6) the message is written in register $M_4$ and its character is indicated to encoder $PE_1$ by way of decoder $D_1$. Memory RM determines, from the state of the connection, whether the stored message can be properly forwarded to the engaged modem; if so, it enters in register MS a code signifying the state of "message in transmission" and, via network LD and multiplexer $MX_1$, allows that message to be sent out by way of register $M_2$. At this time, network LD starts a count to determine the length of time required for the transmission of the message now contained in register $M_2$. During each processing step, as determined by the scanning information on leads 21 and 47, network LA picks up the count of register MC and, if enabled by synchronization signals from register $M_1$ via leads 27, 28 and 49, updates the information relative to this count. Upon the termination of this operation, network LA so informs the encoder $PE_1$ which correspondingly advises the memory RM; the latter in turn inscribes in register MS the state of "emission of carrier wave" and delivers a corresponding command to register $M_2$ as described above. Memory RM thereupon is ready for the arrival of a new message. During the transfer of a message from register $M_4$ to register $M_2$, memory RM transmits via circuits LD, $PE_2MX_2$ and $M_3$ a consent signal for the emission of the next message, that signal reaching the processor EL through cable 13 and coder COD.

Incoming line signals are handled by the couplers without intervention of modems. Their arrival at the coupler $T_i$ (FIG. 3) is detected by intergrator IN and counter CN which is reset after each counting sequence. The resulting code signals from circuit CO, described above with reference to FIG. 5, are transmitted through circuit S to interface unit IP to identify the incoming signal. If decoder DE has been informed by the interface unit IP that the exchange acts only in a transitory capacity, gate ST is enabled to pass all signal pulses from integrator IN to lead $\alpha_{Ri}$; coder CO is disabled under these conditions and cannot respond to a pulse count smaller than 3.

If, on the other hand, decoder DE is instructed that the exchange is the terminal of the inter-office connection about to be established, gate ST is enabled to transmit only the first pulse of the incoming series as an answer-back signal to the remote calling subscriber.

The transmission of outgoing line signals also involves only the couplers and not the modems. Processer EL loads memory MG through decoder DEC (FIG. 7), via connection 72, with a "transmit signal" instruction. Memory MG sends such a signal, via connection 67, to transmitter TS which generates a pulse sequence on lead $\alpha_T$ for integration in circuit S and delivery to the associated coupler $T_i$ (FIG. 3) where it triggers the pulse regenerator GI. The latter then emits a pulse of predetermined length on wire $c'$ in response to each of these signal pulses, unless decoder DE has received from interface unit IP a standby code (second row in FIG. 4) which preserves the duration of the arriving signal pulses in the output of regenerator GI whereby a blocking signal on lead $\alpha_T$ allows the transmission of a pulse of a duration exceeding the upper threshold of integrator IN.

We claim:

1. In a telecommunication system including a plurality of central offices each associated with a group of subscriber stations, a multiplicity of inter-office channels for the exchange of messages between subscribers of different groups, and a processor at each central office adapted to seize a channel leading to a central office associated with a remote subscriber station identified by selection signals from a local subscriber station, in combination:

a multiplicity of couplers at each central office connected to respective channels terminating thereat;
a plurality of centralized modems at each central office adapted to translate routing instructions from said processor into outgoing line signals transmittable via said couplers over a seized channel in a frequency band allocated to message transmission and to retranslate incoming line signals from a seized channel into data recognizable by said processor;
storage means at each central office for continuously registering the state of availability of each of said modems; and
switching means at each central office connected to said storage means and controlled by said processor for temporarily connecting an available modem to a seized channel through the coupler thereof in response to incoming line signals and to local selection signals, each coupler including circuitry for recognizing and repeating outgoing and incoming line signals.

2. The combination defined in claim 1 wherein said channels are different frequency bands transmitted over a common inter-office link.

3. The combination defined in claim 1 wherein said switching means includes timing means for scanning said couplers in successive time slots of a time-division-multiplex cycle.

4. The combination defined in claim 3 wherein said switching means includes a memory unit provided with transmission error-checking and synchronization means.

5. The combination defined in claim 1 wherein said modems include sources of line-seizure signals of a predetermined frequency, said circuitry of each coupler comprising a signal detector responsive to said predetermined frequency.

6. The combination defined in claim 1 wherein said circuitry of each coupler includes pulse-detecting means responsive to an amplitude-modulated oscillation of fixed frequency, counting means controlled by said pulse-detecting means, and coding means responsive to the number of pulses determined by said counting means.

7. The combination defined in claim 6 wherein said circuitry of each coupler further includes decoding means responsive to instructions from said processor for selectively modifying the response of said coding means to said number of pulses.

8. The combination defined in claim 7 wherein said circuitry of each coupler comprises gate means controlled by said decoding means for passing incoming signals to said switching means for retransmission via another modem in response to a transit instruction delivered from said processor to said decoding means.

9. The combination defined in claim 8 wherein said decoding means has an output for modifying the operation of said gate means, in response to a terminal instruction from said processor, to pass only the first pulse in a series of pulses emitted by said pulse-detecting means.

10. The combination defined in claim 6 wherein said pulse-detecting means comprises an integrator with a first threshold for discriminating between pulses of a duration below and above a predetermined first time limit and with a second threshold for distinguishing pulses of a duration exceeding a second time limit, said integrator having an output energizable by the last-mentioned pulses to deactivate said coding means, said counting means being connected to receive only pulses of a duration falling between said first and second time limits.

* * * * *